April 1, 1969   G. COMTE   3,436,141
HOLLOW WAVE GUIDE WITH SELECTIVELY REFLECTING INNER FACE
Filed Feb. 25, 1965
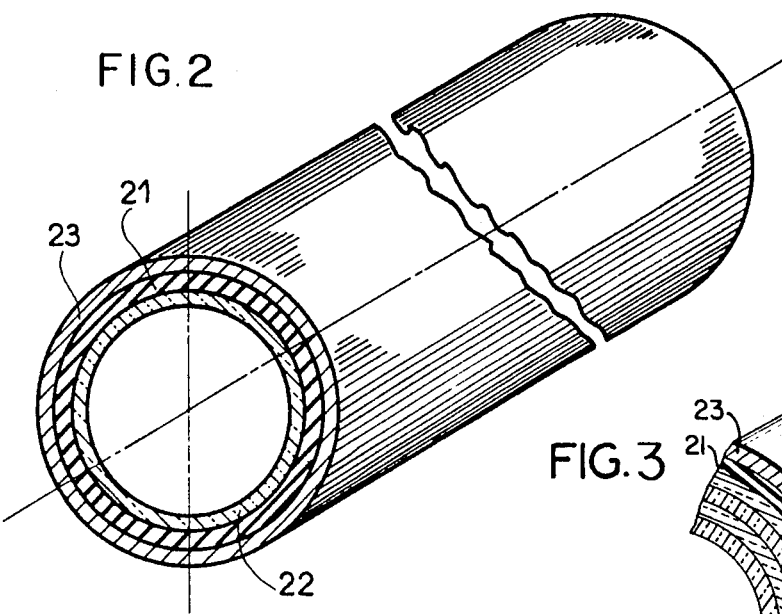
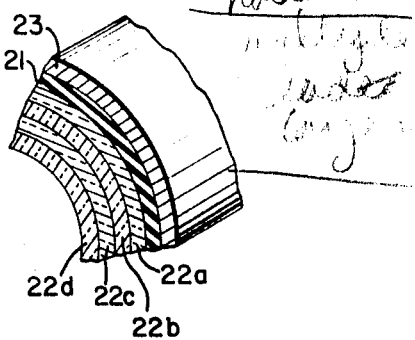
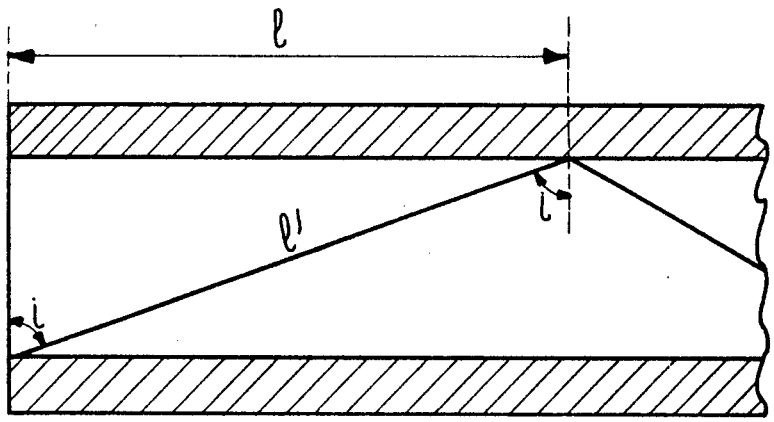

United States Patent Office 3,436,141
Patented Apr. 1, 1969

3,436,141
HOLLOW WAVE GUIDE WITH SELECTIVELY REFLECTING INNER FACE
Georges Comte, Saint-Leu-la-Foret, France, assignor to Compagnie Generale d'Electricite, La Boetie, France, a French corporation
Filed Feb. 25, 1965, Ser. No. 435,153
Claims priority, application France, Feb. 26, 1964, 965,220
Int. Cl. G02b 5/14; H01p 3/14, 3/20
U.S. Cl. 350—96                   3 Claims

ABSTRACT OF THE DISCLOSURE

A hollow wave guide for light rays the internal face of which is coated with a light absorbing layer which, in turn, is provided with a semireflecting layer. Rays of grazing incidence are reflected by the last-named layer, others are transmitted and absorbed by the first-named layer.

---

This invention relates to wave propagation and particularly to a waveguide apparatus for transmitting light and infrared radiation.

The invention of devices emitting great power light or infra-red coherent waves commonly called "lasers" suggests that these devices shall be used within a more or less close future for the transmission of very great quantities of telephonic or televisual informations.

However, the transmission in the atmosphere of light or infrared waves does not seem possible beyond some kilometers because of the atmospheric absorption very high in the case of rain or fog, and it is natural to be brought to face the achievement of lines in which these waves are enclosed within hollow airtight tubes, empty of air and constituting real "light waves guides."

The construction of these light or infrared waveguides sets difficult problems. As a matter of fact whatever can be the diameter which is reasonably contemplated for these guides, and the fineness of the emitted beam of light, it does not seem possible to obtain them in a sufficiently rectilinear way to avoid the transmitted luminous beam to meet the inner walls of the guides. If these inner walls are covered with an absorbent coating, a great quantity of energy will be lost at each bend and the attenuation in line will be prohibitive.

If on the contrary, the inner walls of the guides are covered with a reflecting coating, the luminous beam will be reflected with very weak losses, however it will not be possible to avoid certain scattering of the transmitted beam of rays. The rays having undergone reflections under different incidences will have followed different optical ways, and at the far end of the line, signals distorted by a kind of sledging trainage very prejudicial to the quality of the transmission will be received.

Accordingly, it is an object of this invention to avoid the above-mentioned difficulties by providing a light waveguide which allows the transmission of the light waves along the inner walls of the guide only by reflection under a grazing incidence.

The guide according to this invention is characterized in that its inner walls are made so that their reflecting factor be maximum for grazing incidence rays and substantially zero for any other incidence angle rays. Thus the rays hitting the guide wall with an incidence angle different from 90° will be absorbed without reflection by the wall, and the signals received at the far end of the line will be borne only by wave having followed the shorter way.

Other objects and advantages will become apparent after reading the following description taken with the drawings in which:

FIG. 1 is a schematic view illustrating the principles of this invention;

FIG. 2 is a perspective elevational view of the waveguide according to this invention; and FIG. 3 is a cutaway perspective view of a modified form of the waveguide according to this invention.

Referring now to FIG. 1, if $1'=1/\sin i$ designates the way followed by a luminous ray having an angle $i$ with the normal to the guide wall, between two successive reflections on said wall in points distant from each other of 1, the total course $1'=n1'$ made by said luminous ray after $n$ successive reflections on said wall is minimal if all incidence angles of said ray are equal to 90°.

According to a first embodiment of a guide according to the invention, the inner wall of said guide is made of a layer absorbing the luminous beams, covered with a semireflecting coating, the thickness of which is a small fraction of the wavelength of the luminous radiation applied to the guide.

The luminous rays which come onto this semireflecting layer under an incidence angle differing from 90°, go through said layer without being reflected and are then scattered by the absorbing layer. The rays coming under a grazing incidence ($i=90°$) are reflected by the semireflecting layer and can follow their way within the guide.

FIGURE 2 shows such an embodiment. 21 designates the absorbing layer which may be constituted fon instance by a paint or a polymerisable resin incorporating, as a filler, a great percentage of carbon black or similar material absorbing the luminous rays.

22 designates the inner semireflecting layer which can be obtained by any process, such as cathodic projection of a good conducting metal (silver, aluminium), deposition by reduction, electrolysis, etc. The guide is covered by a sheath 23 protecting it from mechanical stresses or the corrosion which it may undergo.

In a second embodiment of the light-waveguide according to the invention as shown in FIG. 3, the inner semireflecting layer is made up of several elementary layers 22a, 22b, 22c, 22d, the thickness of which being equal to a quarter of wave length of the radiation applied to the guide and constituted of dielectric transparent materials having refraction indexes alternately high and low.

By way of example, the high refractive index material may be zinc sulphur and the low refraction index material may be cryolite.

The whole of these elementary layers presents for the small incidence light rays a more reduced absorption than a semireflecting metallic layer, but their reflection factor is higher for the rays coming onto the guide wall under a grazing incidence.

It is evident that various modifications and changes may be made in the embodiment of the invention herein illustrated and described without departing from the spirit or scope of the invention.

What I claim is:

1. A hollow wave guide for light rays, including infrared rays, of given wave length, comprising an outer tube having an internal face, a first layer applied to said internal face and adapted to absorb said rays and a second, semireflecting layer applied to said first layer and having a thickness small with respect to said wave length, the thickness of said semireflecting layer being chosen to provide maximum reflection for rays at grazing incidence and substantially zero reflection for rays at other angles.

2. A wave guide as defined in claim 1, wherein said outer tube is of circular cross section.

3. A wave guide as defined in claim 1, wherein said second layer is formed of a plurality of superimposed layers having alternately high and low indices of refraction, said second layer has a thickness equalling a quarter of said given wave length.

References Cited

UNITED STATES PATENTS 2,552,184   5/1951   Koch.
3,350,654   10/1967   Snitzer.
3,353,115   11/1967   Maiman _____ 331—94.5

FOREIGN PATENTS 285,738   2/1928   Great Britain.

JOHN K. CORBIN, *Primary Examiner.*

U.S. Cl. X.R.

350—319; 333—95